United States Patent [19]

Hamamura et al.

[11] 4,039,517

[45] Aug. 2, 1977

[54] HYDROPHILIC AND THERMOREACTIVE URETHANE COMPOSITIONS WITH IMPROVED PROPERTIES

[75] Inventors: Tamotu Hamamura, Joyo; Sumio Goto, Uji; Kazuhiko Ishihara, Kyoto, all of Japan

[73] Assignee: Dai-Ichi Kogyo Seiyaku Co., Ltd., Kyoto, Japan

[21] Appl. No.: 582,003

[22] Filed: May 29, 1975

[30] Foreign Application Priority Data

May 29, 1974 Japan .................................. 49-61223
May 29, 1974 Japan .................................. 49-61224
June 11, 1974 Japan .................................. 49-66926

[51] Int. Cl.$^2$ ............................................. C08G 18/06
[52] U.S. Cl. ............................ 260/77.5 TB; 156/331; 260/77.5 AM; 428/425
[58] Field of Search .............. 260/77.5 AM, 77.5 TB, 260/29.2 TN; 428/425, 904; 156/331

[56] References Cited

U.S. PATENT DOCUMENTS

| | | | |
|---|---|---|---|
| 2,746,988 | 5/1956 | Doser ..................... | 260/77.5 TB UX |
| 3,438,940 | 4/1969 | Keberle et al. .......... | 260/29.2 TN X |
| 3,898,197 | 8/1975 | Guise et al. ............. | 260/77.5 TB |

*Primary Examiner*—Lewis T. Jacobs
*Attorney, Agent, or Firm*—Sughrue, Rothwell, Mion, Zinn and Macpeak

[57] ABSTRACT

A hydrophilic and thermoreactive urethane composition having improved properties such as stability in solution, non-tackiness, water resistance and strength and useful in treating and finishing fibrous products prepared by forming a urethane prepolymer containing free isocyanate groups from (a) (1) a compound containing at least 2 active hydrogen atoms, containing an oxyethylene chain, and having a molecular weight of about 200 to 20,000, or (2) a compound containing at least 2 active hydrogen atoms, not containing an oxyethylene chain, and having a molecular weight of about 200 to 20,000 and a compound containing at least 2 active hydrogen atoms, containing an oxyethylene chain and having a molecular weight of about 200 to 200,000; and (b) an excess of a polyisocyanate; and if desired, (c) a chain extender containing at least 2 active hydrogen atoms; whereby the prepolymer has an oxyethylene chain content of 10 to 40% by weight, and then reacting the prepolymer or a solution thereof with not more than 3 times the equivalent of the free isocyanate groups in the prepolymer of an aqueous solution of a bisulfite salt having a concentration of at least 15% by weight. Where the urethane prepolymer contains at least 1% by weight ester groups, the hydrophilic and thermoreactive urethane composition is particularly valuable as a high strength adhesive composition and is useful as an adhesive in bonding a sheet-like material as a top-coat to a fabric as a base in producing an artificial leather.

15 Claims, No Drawings

HYDROPHILIC AND THERMOREACTIVE URETHANE COMPOSITIONS WITH IMPROVED PROPERTIES

BACKGROUND OF THE INVENTION

1. Field of the Invention

This invention relates to a hydrophilic and thermoreactive urethane composition having improved properties, e.g., such as stability in solution, non-tackiness, water resistance and strength, or in other words, a urethane composition that contains stabilized isocyanate groups and is soluble in water or self-dispersible in water (hereinafter, this property of being self-dispersible in water will be referred to as "hydrophilic").

This invention also relates to a thermoreactive urethane aqueous adhesive composition comprising a hydrophilic and thermoreactive urethane composition.

This invention additionally relates to a process for producing an artificial leather having superior bond strength, water resistance, wash resistance and solvent resistance using a hydrophilic thermoreactive urethane composition.

This invention further relates to a method for finishing fibrous products using a treating liquor comprising a hydrophilic and thermoreactive urethane composition.

2. Description of the Prior Art

A number of aqueous urethane composition have been previously known. These urethane compositions are either those having anionic, cationic or nonionic hydrophilic groups in the polyurethane substrate in sufficiently large quantities that the compositions are rendered hydrophilic, or those in which the polyurethane substrate is emulsified using fairly large quantities of an emulsifying-dispersing agent. Accordingly, conventional urethane compositions suffer from the disadvantage that aqueous solutions or dispersions thereof have poor stability or give rise to difficulties such as gum-up, and polyurethanes obtained therefrom have unsatisfactory properties such as high tackiness, or poor water resistance and strength.

Further, in the past various adhesives have been utilized for many laminated materials or composite materials, and it is well known that polyurethane-type adhesives or the so-called polyisocyanate-type adhesives comprising urethane prepolymers or mixtures of polyisocyanates with active hydrogen-containing compounds are an example of such adhesives. These polyisocyanate-type adhesives have many characteristics such as high bond strength, superior water resistance and chemical resistance, and do not give off formaldehyde. Furthermore, depending upon the composition, these adhesives become elastic and flexible, and, therefore, are suitable for bonding parts which undergo bending and flexure. Thus, these adhesives have been used to bond various materials such as wood, fibrous materials, natural and synthetic rubbers, plastics, metals and glass. Many of these adhesives, especially polyurethane-type adhesives, require considerable amounts of solvent, and the danger of toxicity, fire, and explosion ascribable to the solvent is increased. Moreover, the use of a solvent degrades the working environment and the natural environment. A solvent sometimes is not required in a urethane prepolymer or a polyisocyanate mixture, but there still is the problem of toxicity due to vaporization of isocyanate monomer present in the composition. Furthermore, such an adhesive gels during storage for long periods of time or during treatment for long periods of time, and many difficulties, both of an economical nature and from the standpoint of efficiency, occur.

Emulsions obtained by specifically emulsifying polyurethane elastomers with an emulsifying-dispersing agent have been proposed. However, these polyurethane elastomers have poor stability, and most of them have inferior bond strength, water resistance and chemical resistance to the above-mentioned adhesives.

In view of this situation, extensive investigations have been made with a view to obtaining an aqueous urethane composition and an adhesive composition which can be used safely in an aqueous system continuously for long periods of time and stored for a long time, and also which has high bond strength and very superior water resistance and chemical resistance.

Further, in the production of artificial leather by bonding a sheet-like material capable of being used as a top-coat to a fabric capable of becoming a base, solvent solutions of polyurethane resins or urethane prepolymers having strong and elastic adhesive strength have frequently been used in the past. However, such a method involves high production cost because of the use of large quantities of solvent, and problems such as bad odor, toxicity or the danger of an explosion have been of concern. In using urethane prepolymers, solvents are not always required, but many operational difficulties such as a gellation of the prepolymers or the toxicity of isocyanate vapor have been encountered.

Attempts have been made to use aqueous adhesives of polyurethane emulsions obtained by emulsifying polyurethane resins or rendering them self-emulsifiable. However, these adhesives which have been emulsified hve poor emulsion stability, and can not be stored for long periods of time. Furthermore, these adhesives gum-up during operation, and most of them have unsatisfactory bond strength, wash resistance and solvent resistance. These adhesives which are self-emulsifiable have good emulsion stability, but usually have extremely poor bond strength and especially, extremely poor water resistance and wash resistance.

It is also well known that polyurethane resins or urethane prepolymers, in the presence of solvents, can be applied to fibrous products. The fibrous products so finished have durable improved feel, stiffness, elastic recovery, crease resistance, shrink resistance, form retention, or anti-pilling property. However, a risk of toxicity or explosion exists in using solvents, and many problems are involved in the application of solvents. Furthermore, when urethane prepolymers are used, their solutions gel with time, and many operational difficulties occur.

Various polyurethane emulsions for enabling such a fibrous treating method to be carried out in an aqueous system are known. As described above, there are two types of polyurethane emulsions, self-emulsifiable polyurethane resins and positively emulsified polyurethane resins. The former type is still tacky because of its composition, and most species of this type can not impart stiffness and elastic recovery to fibrous products and have poor wash resistance. The latter type shows a considerable improvement over the former in regard to tackiness, stiffness, elastic recovery and wash resistance, but since it is affirmatively emulsified, the stability of the emulsion is extremely poor. Thus, emulsions of this type are difficult to store for long periods of time. Moreover, most of the emulsions of this type gum-up whereby they adhere in mass to mangle rolls or the fibrous products during treatment.

SUMMARY OF THE INVENTION

An object of this invention, therefore, is to provide a urethane composition from which the defects of conventional aqueous urethane compositions and polyurethanes obtained therefrom have been eliminated, and which can be used with good results in aqueous systems because the compositions are soluble in water or dispersible in water in a stable manner.

Accordingly, this invention provides a hydrophilic and thermoreactive urethane composition prepared by forming a low-mulecular-weight, substantially gel-free urethane prepolymer containing free isocyanate groups from (a) (1) a compound containing at least 2 active hydrogen atoms, containing an oxyethylene chain, and having a molecular weight of about 200 to 20,000, or (2) a compound containing at least 2 active hydrogen atoms, not containing an oxyethylene chain, and having a molecular weight of about 200 to 20,000 and a compound containing at least 2 active hydrogen atoms, containing an oxyethylene chain and having a molecular weight of about 200 to 200,000; and (b) an excess of a polyisocyanate; and, if desired, (c) a chain extender containing at least 2 active hydrogen atoms; whereby the prepolymer has an oxyethylene chain content of 10 to 40% by weight, and reacting the prepolymer or a solution thereof in a solvent with not more than 3 times the equivalent of the free isocyanate groups in the prepolymer of an aqueous solution of a bisulfite salt of a concentration of at least 15% by weight, thereby to block the free isocyanate groups with the bisulfite and render the urethane prepolymer hydrophilic.

In another embodiment, this invention provides a thermoreactive aqueous adhesive composition comprising a hydrophilic and thermoreactive urethane composition prepared by forming a urethane prepolymer containing free isocyanate groups from (a) (1) a compound containing at least 2 active hydrogen atoms, containing an oxyethylene chain, and having molecular weight of about 200 to 20,000, or (2 ) a compound containing at least 2 active hydrogen atoms, not containing an oxyethylene chain, and having a molecular weight of about 200 to 20,000 and a compound containing at least 2 active hydrogen atoms, containing an oxyethylene chain and having a molecular weight of about 200 to 20,000; and (b) an excess of a polyisocyanate; and, if desired (c) a chain extender containing at least 2 active hydrogen atoms, whereby the prepolymer has (i) at least 10% by weight of oxyethylene chains and (ii) at least 1% by weight of ester groups; and reacting the prepolymer or a solution thereof in a solvent with not more then 3 times the equivalent of the free isocyanate groups in the prepolymer with an aqueous solution of a bisulfite salt in a concentration of at least 15% by weight, thereby blocking the free isocyanates with the bisulfite and rendering the urethane prepolymer hydrophilic.

In a further embodiment, the invention provides a process for producing artificial leather having excellent characteristics comprising heat-treating a sheet-like material capable of being used as a top-coat and a napped or unnapped fabric, such as a non-woven fabric, a knitted or woven fabric or a paper cloth, capable of becoming a base, and bonding them to each other using an aqueous adhesive comprising a hydrophilic and thermoreactive urethane composition, the urethane composition being prepared by forming a urethane prepolymer containing free isocyanate groups from (a) (1) a compound containing at least 2 active hydrogen atoms, containing an oxyethylene chain, and having a molecular weight of about 200 to 20,000, or (2) a compound containing at least 2 active hydrogen atoms, not containing an oxyethylene chain, and having a molecular weight of about 200 to 20,000 and a compound containing at least 2 active hydrogen atoms, containing an oxyethylene chain and having a molecular weight of about 200 to 20,000; and if desired, (c) a chain extender containing at least 2 active hydrogen atoms; whereby the prepolymer has (i) at least 10% by weight oxyethylene chains and (ii) at least 1% by weight of ester groups, and then reacting the prepolymer or a solution thereof with not more than 3 times the equivalent of the free isocyanate groups in the prepolymer of an aqueous solution of a bisulfite salt having a concentration of at least 15% by weight.

In an even further embodiment of this invention, the invention provides a method of treating fibrous products comprising applying to a fibrous product a treating liquor comprising a hydrophilic and thermoreactive urethane composition, the urethane composition being prepared by forming a urethane prepolymer containing free isocyanate groups from (a) (1) a compound containing at least 2 active hydrogen atoms, containing an oxyethylene chain, and having a molecular weight of about 200 to 20,000, or (2) a compound containing at least 2 active hydrogen atoms, not containing an oxyethylene chain, and having a molecular weight of about 200 to 20,000 and a compound containing at least 2 active hydrogen atoms, containing an oxyethylene chain and having a molecular weight of about 200 to 20,000; and (b) an excess of a polyisocyanate; and if desired, (c) a chain extender containing at least 2 active hydrogen atoms; whereby the prepolymer has an oxyethylene chain content of 10 to 40 % by weight, and then reacting the prepolymer or a solution thereof with not more than 3 times the equivalent of free isocyanate groups in the prepolymer of an aqueous solution of a bisulfite salt having a concentration of at least 15% by weight, and then drying and heat-treating the fibrous product.

DETAILED DESCRIPTION OF THE INVENTION

It is essential in the hydrophilic and thermoreactive urethane composition of the present invention that the urethane prepolymer should have an oxyethylene chain content of 10 to 40% by weight and that the urethane prepolymer or the solution thereof be reacted with an aqueous solution of a bisulfite salt of a concentration of at least 15% in an amount not more than 3 times the equivalent of the free isocyanate groups in the prepolymer. When these two requirements are met, a hydrophilic and thermoreactive urethane composition having improved properties such as good stability in solution, non-tackiness, water resistance and strength can be prepared. In general, the bisulfite is employed in an amount of at least about 0.8 times the equivalent of the free isocyanate groups and the concentration of the bisulfite solution can range up to about 40% by weight. Suitable examples of bisulfites which can be employed are alkali metal bisulfites such as sodium bisulfite, potassium bisulfite, etc., alkaline earth metal bisulfites such as magnesium bisulfite and ammonium bisulfite, preferably sodium bisulfite, potassium bisulfite and ammonium bisulfite.

The basic concept of the present invention and particularly for the first embodiment thereof is that a urethane prepolymer which contains free isocyanate groups and which is substantially free from any gel material is reacted with a bisulfite as a blocking agent to block the isocyanate groups, whereby the resulting product forms a stable aqueous solution or emulsion and, upon heating, the blocking agent is dissociated to regenerate the isocyanate groups and thus to form polyurethanes.

The basic concept of the second embodiment of this invention is that a urethane prepolymer containing free isocyanate groups is reacted with a bisulfite salt to block the isocyanate groups and to form a urethane composition that forms a stable aqueous solution as described hereinabove for the first embodiment, and an adhesive containing this composition is prepared; and that after the adhesive is applied to an adherend, the adhesive is heated appropriately to dissociate the blocking agent and regenerate the isocyanate groups, whereby the composition adheres firmly to the adherend with the resulting composite having excellent water resistance and chemical resistance.

Previously known blocking agents for isocyanate groups include, for example, phenols, alcohols, active methylene compounds, oximes, mercaptans, imines, lactams, amides, imides, and bisulfite salts. All these blocking agents, with the exception of the bisulfite salts, dissociate at high temperatures and also require heat-treatment for long periods of time, and therefore, are very limited in their use. Moreover, undesirable difficulties such as a degradative decomposition or a yellowing of the resulting polyurethanes occurs.

On the other hand, bisulfite salts have a low dissociation temperature (e.g., about 50° C) and the time required for the heat-treatment can be shortened. When the isocyanate groups are blocked with bisulfite salts, anionic hydrophilic groups result. Hence, bisulfite salts are very useful as blocking agents, and are especially preferred when applied to hydrophilic urethane compositions. However, since bisulfite salts are substantially soluble only in water, the blocking reaction must be carried out in an aqueous system, such as in water or a mixture of water and water-miscible solvents such as an alcohol, e.g., methanol, in an amount up to about 60 to 70% by weight, and the anionic or nonionic properties of the urethane substrate must be quite high.

The reason for using bisulfite salts as a blocking agent for the free isocyanate groups is that, as described hereinbefore, bisulfite salts have very low dissociation temperatures as compared with other blocking agents, and the heat-treating time to achieve adhesion can be shortened, and that when the isocyanate groups are blocked with bisulfite salts, anionic hydrophilic groups are produced, which characteristics are very useful.

The adhesive used in the process for producing an artificial leather of this invention as described above in a further embodiment of the present invention is a bisulfite blocked product of a urethane prepolymer containing free isocyanate groups, and has good solution stability and resistance to gum-up because it is gel-free, has a relatively low molecular weight, and contains anionic hydrophilic groups ascribable to the bisulfite salt block. The bisulfite salt dissociates on heat-treatment to regenerate active isocyanate groups which react with the functional groups containing active hydrogen atoms of the sheet-like material top-coat and the fabric base employed therewith to bond them firmly to each other. Furthermore, an anionic hydrophilic groups disappear at the time of the dissociation of the bisulfite salt upon heating. Accordingly, an artificial leather having superior bond strength, water resistance, wash resistance and solvent resistance, etc., can be obtained.

The reason for the use of the bisulfite salt as a blocking agent for isocyanate groups in an adhesive for producing an artificial leather is that since the dissociation temperature is very low, the heat-treating time can be shortened, as described above, and in addition it fully meets the manufacturing conditions for producing artificial leathers which are now in use, and also that this blocking agent provides anionic hydrophilic groups. The inclusion of at least 10% by weight of oxyethylene chains in the urethane prepolymer from which the adhesive is derived is for the purpose of smoothly blocking the free isocyanate groups with the bisulfite salt.

The finishing agent used in a further embodiment of this invention is also a bisulfite blocked product of a urethane prepolymer containing free isocyanate groups, and has good solution stability and resistance to gum-up because it is gel-free, has a relatively low molecular weight, and contains anionic hydrophilic groups ascribable to the bisulfite salt block. The bisulfite salt dissociates on heat-treatment to regenerate active isocyanate groups which react with the functional groups containing active hydrogen atoms of the fibrous products. Furthermore, the urethane composition reacts with itself to become a product with a higher molecular weight. Furthermore, anionic hydrophilic groups present in the prepolymer due to the blocking by the bisulfite disappear from the urethane composition at the time of the heat dissociation of the bisulfite salt, and the oxyethylene chain content of the prepolymer is maintained low. Because of the above, the finishing agent can impart the above-described advantageous characteristics to the fibrous products.

When oxyethylene chains are present in large amounts, the properties, such as water resistance, of the finally obtained polyurethanes are not altogether satisfactory, and are unsuitable as finishing agents which require durability. In this regard, it has been found that if the oxyethylene chain content is reduced, the various properties are gradually improved, and if the content is adjusted to not more than 40% by weight, the properties, such as water resistance, can be markedly improved. Therefore, finishing agents having satisfactory durability can be obtained.

From a commercial standpoint, it is considered most advantageous to include oxyethylene chain-based nonionic hydrophilic groups in urethane prepolymers. This can be achieved by various methods, for example, a method comprising adding polyethylene glycol as one reaction component in the synthesis of urethane prepolymers, a method comprising adding a random or block copolyether of ethylene oxide and propylene oxide, for example, as one reaction component, or a method involving the use of a polyol prepared by adding ethylene oxide to a previously produced polyester.

In fact, the isocyanate groups of prepolymers containing large amounts of oxyethylene chains are easily blocked in an aqueous solution of a bisulfite salt to produce hydrophilic and thermoreactive urethane compositions. However, when the oxyethylene chains are present in large quantities, the properties of the resulting polyurethanes, such as water resistance, are not entirely satisfactory. In this regard, it has not been found that these properties are improved gradually as the oxyethylene chain content is reduced, and when it is reduced to 40% by weight or less, various properties such as water resistance can be markedly improved. If, however, the oxyethylene chain content is further reduced to below 10% by weight, the hydrophobic property of the prepolymer becomes too strong and various difficulties occur. For example, even when the prepolymer is mixed with an aqueous solution of a bisulfite, they separate from each other, resulting in a failure in the blocking reaction, and furthermore, the prepolymer gels. Hence, the desired hydrophilic and thermoreactive urethane compositions can not be obtained. Further, the oxyethylene chain content in the thermoreactive adhesive composition of this invention is at least 10% by weight, but where durability, for example, in boiling water for long periods of time is required, the content is preferably not more than 40% by weight.

In many cases, prepolymers having an oxyethylene chain content of 10% to 40% by weight are hydrophobic, and it is frequently difficult to disperse there prepolymers in water or an aqueous solution of a bisulfite salt even using a high performance stirring means such as a homogenizer, or to react them completely with a bisulfite salt. In such a case, the absolute amount of water is reduced by, for example, increasing the concentration of the aqueous solution of the bisulfite salt. Accordingly, in the present invention, the aqueous solution of the bisulfite salt contains the bisulfite in an amount not more than 3 times the equivalent of the free isocyanate groups to adjust the concentration in the aqueous solution to at least 15% by weight. In such a case, the resulting system sometimes forms a water-in-oil emulsion in the early stage.

The adjustment of the oxyethylene chain content of the urethane prepolymer to not more than 40% by weight and the blocking of the free isocyanate groups with the bisulfite salt are two important requirements for achieving improved properties in the resulting polyurethanes. Furthermore, the inclusion of the oxyethylene chain in an amount of at least 10% by weight, and the adjustment of the concentration of the bisulfite salt in the aqueous bisulfite solution to at least 15% by weight by including the bisulfite in an amount not more than 3 times the equivalent of the free isocyanate groups are requirements for blocking the free isocyanate groups smoothly.

Another requirement for thermoreactive adhesive compositions is that ester groups should be included in the prepolymer in an amount of at least 1% by weight. This is because ester groups have been found to contribute greatly to an increase in bond strength and thus are advantageous in an adhesive composition. This increase in bond strength is considered to be due to the cohesive force of the ester group itself or the formation of a hydrogen bond, but at the present time the actual mechanism has not yet been clarified. In general, a suitable ester group content can range up to about 50% by weight. Surprisingly, in comparison with the case where the prepolymer does not contain any ester groups, the inclusion of a very small amount, for example, 1% by weight, of ester groups results in a marked increase in bond strength, and also improved water resistance and especially, increased solvent resistance. Various procedures can be employed in order to introduce ester groups into the prepolymer. For example, a polyester polyol or a polyester ether can be employed as a reaction component.

In the synthesis of a urethane prepolymer suitable for the thermoreactive aqueous adhesive composition of this invention, it is ncesssary to adjust the proportion of the reaction components so that the prepolymer contains at least 10% by weight of oxyethylene chains and at least 1% by weight of ester groups.

The hydrophilic and thermoreactive urethane compositions of this invention have markedly improved stability in solution and resistance to gum-up in comparison with conventional aqueous urethane compositions. The various properties of the polyurethanes obtained from these compositions, such as non-tackiness, water resistance and strength, are also markedly improved.

The bisulfite-blocked urethane prepolymer of this invention is free from any gel material, has a relatively low molecular weight, contains anionic hydrophilic groups as a result of blocking with the bisulfite salt. Accordingly, its stability in solution and resistance to sum-up are improved. The urethane composition of this invention also is thermoreactive due to the heat of dissociation of the bisulfite salt block, and due to the heat of dissociation, the anionic hydrophilic groups disappear. Furthermore, since the oxyethylene chain content is low, the resulting polyurethanes have improved properties such as low tackiness, and high water resistance and strength. The urethane composition of this invention can be used to produce polyurethanes having superior properties which can not be obtained at all with conventional aqueous urethane compositions, and are equivalent to those properties of polyurethanes obtained, for example, from solvent solutions of prepolymers or solvent solutions of urethane elastomers.

Generally known compounds containing at least 2 active hydrogen atoms and having a molecular weight of about 200 to 20,000 are compounds containing at least 2 hydroxyl, carboxyl, amino or mercapto groups at the terminals or in the molecule, and preferably include polyethers, polyesters and polyether esters.

Examples of suitable polyethers are polymers of or random or block copolymers of alkylene oxides such as propylene oxide or ethylene oxide, styrene oxide, or epichlorohydrin, or the adducts of these alkylene oxides with polyhydric alcohols.

Suitable polyesters and polyether esters include, for example, substantially linear or branched condensation products prepared from saturated or unsaturated polycarboxylic acids or the anhydrides thereof, such as succinic acid, adipic acid, phthalic acid or maleic anhydride, and saturated or unsaturated polyhydric alcohols, such as ethylene glycol, diethylene glycol, 1,4-butanediol, neopentyl glycol, 1,6-hexanediol or trimethylol propane, relatively low-molecular-weight polyalkylene glycols such as polyethylene glycol or polypropylene glycol, or mixtures thereof; polyesters derived from lactones and hydroxy acids; and polyether esters resulting from the addition of ethylene oxide or propylene oxide, etc., to a previously prepared polyester.

Examples of suitable polyisocyanates for preparing urethane polymers by reaction with the above compounds containing active hydrogen atoms include isomers of tolylene diisocyanate, aromatic diisocyanates such as 4,4'-diphenylmethane diisocyanate, araliphatic diisocyanates such as xylylene diisocyantes, alicyclic diisocyanates such as isophorone diisocyanate or 4,4'-dicyclohexylmethane diisocyanate, aliphatic diisocyanates such as hexamethylene diisocyanate or 2,2,4-trimethylhexamethylene diisocyante, and addition products of these polyisocyanates with trimethylol propane, etc. These polyisocyanates can be used either individually or as an admixture. When non-yellowing property is of concern, which is particularly important with fibrous products, preferably the araliphatic, alicyclic or aliphatic polyisocyanates are used.

As described above, either a compound containing at least two active hydrogen atoms and containing an oxyethylene chain or the combination of a compound which contains at least two active hydrogen atoms and which does not contain an oxyethylene chain and a compound which contains at least two active hydrogen atoms and which also contains an oxyethylene chain is used. Accordingly a wide variety of materials can be selected, for example, from those materials described above, to achieve the characteristics of the prepolymer of this invention as described above.

Suitable specific examples of compounds containing oxyethylene chains which can be used to achieve the oxyethylene chain content described above in the prepolymers of this invention and suitable examples of polyisocyanates which can be used are described, for example, in U.S. Pat. Nos. 3,438,940 and 3,565,844 and in British Pat. No. 1,062,564.

Examples of suitable chain extenders containing active hydrogen atoms are glycols such as ethylene glycol, diethylene glycol, 1,4-butanediol or 1,6-hexanediol, polyhydric alcohols such as glycerol, trimethylol propane or pentaerythritol, diamines such as ethylene diamine, hexamethylene diamine or piperazine, aminoalcohols such as monoethanolamine or diethanolamine, thiodiglycols such as neodiethylene glycol, and water.

When a urethane prepolymer is prepared from these components, the proportions of the components are adjusted so that the oxyethylene chain content of the prepolymer is at least 10% by weight and preferably 10 to 40% by weight. In order to synthesize prepolymers meeting this requirement, these components are reacted at a temperature of about 150° C or less, preferably 70° to 120° C, for 5 minutes to several hours using conventional one-stage or multi-stage isocyanate polyaddition methods. This isocyanate group/active hydrogen equivalent ratio can be at least about 1.1:1, but it is desirable that the free isocyanate content of the resulting prepolymer should be adjusted to about 10% by weight or less, e.g., about 1% to about 10% by weight preferably 7% by weight or less, e.g., 1% to 7% by weight.

In the synthesis of the prepolymer, an inert gas such as nitrogen, carbon dioxide, helium, argon, etc., can be employed in the reaction system, if desired. Or a catalyst, for example, tertiary amines such as diazabicyclooctane or organic metal compounds such as dibutyl tin dilaurate or mixtures thereof can be used.

The urethane prepolymer from which the hydrophilic and thermoreactive urethane composition used in this embodiment of the invention for treating fibrous products is prepared can be obtained by a conventional method, usually by reacting a polyether polyol, a polyester polyol, a polyesther ester polyol, or a mixture thereof with an excess of a polyisocyanate, optionally in the presence of a low-molecular-weight chain extender. It is essential in this case, as described hereinabove, that 10% to 40% by weight of oxyethylene chains be present. This can be achieved by various methods, for example, a method comprising adding polyethylene glycol or a random or block copolyether of ethylene oxide and propylene oxide as one reaction component, or a method involving the use of a polyol prepared by adding ethylene oxide to a previously produced polyester. Alternatively a method comprising employing one or more of the above described oxyethylene chain containing compounds with another compound or other compounds containing at least two active hydrogen atoms but not containing an oxyethylene chain can be used as one reaction component.

Usually, the prepolymer is prepared in the absence of a solvent. However, depending upon the viscosity of the resulting prepolymer, the prepolymer can be mixed uniformly with a solvent to adjust the viscosity to a suitable viscosity for subsequent processing. The solvent can be added at the time of reaction or after the reaction. Any solvents which are inert to isocyanate groups and can dissolve the prepolymer can be used, but hydrophilic solvents are preferred because the prepolymer is mixed with an aqueous solution of a bisulfite salt in a subsequent step. However, hydrophobic solvents can also be used since the hydrophilic urethane composition itself acts as a kind of emulsifier. Examples of suitable solvents that can be used for this purpose are ketones such as acetone or methyl ethyl ketone, ethers such as tetrahydrofuran or dioxane, amides such as N,N-dimethylformamide, nitriles such as acetonitrile, esters such as ethyl acetate, hydrocarbons such as toluene, and halogenated hydrocarbons such as methylene chloride. These solvents can be used either individually or as an admixture thereof.

If desired, a stabilizer such as an antioxidant or an ultraviolet absorber can also be incorporated in the prepolymer.

The resulting prepolymer or a solvent solution thereof is then mixed with an aqueous solution of a bisulfite salt of a concentration of at least 15% by weight containing the bisulfite salt in an amount of 3 times or less of the equivalent of the free isocyanate groups, thereby a block the isocyanate groups. The reaction is effected by stirring the mixture thoroughly. In many cases, the mixture first forms a water-in-oil emulsion. The reaction is an exothermic reaction, and the reaction temperature is desirably 60° C or lower, e.g., from about 0° C to about 60° C. The reaction is achieved by stirring the mixture for about 5 minutes to about 1 hour. Then, the mixture is diluted with water to a suitable concentration to form the desired hydrophilic and thermoreactive urethane composition.

Depending upon the composition of the prepolymer, some prepolymers change from a water-in-oil emulsion to an oil-in-water emulsion in about 10 to 30 minutes after the initiation of the blocking reaction. With other prepolymers, a water-in-oil emulsion is maintained during the reaction, but, when diluted with water, the water-in-oil emulsion changes to an oil-in-water emulsion. Both of these types of prepolymers ultimately provide stable aqueous urethane compositions whose free isocyanate groups are blocked with the bisulfite salt.

These urethane compositions can be stored for long periods of time. In use, these urethane compositions are adjusted to suitable concentrations and viscosities, and are heated usually to about 80° to 180° C, whereby the bisulfite salt block is dissociated with the reactive isocyanate groups being regenerated as a result of this heating, the anionic hydrophilic groups disappear from the prepolymer, and the isocyanate groups react. Accordingly, the resulting polyurethanes have superior properties such as non-tackiness, water resistance and strength as compared with conventional aqueous polyurethanes.

These properties are comparable to the properties of solvent-type polyurethane compositions.

An aqueous solution or emulsion of the resulting urethane composition is anionic, and can be mixed with a non-ionic or anionic aqueous solution or dispersion of other resins such as polyvinyl acetate, polyvinyl chloride, polyvinyl alcohol, or polyacrylates, particularly where the composition is to be used as an adhesive. Also, fillers, extenders or thickners, such as glass fibers, talc or carboxymethyl cellulose can be included in the composition. In some case, pigments or dyes can be incorporated into the composition during the manufacturing process or into the final products.

Since the urethane compositions of this invention are hydrophilic and are thermoreactive whereby the isocyanate groups are regenerated under very mild heat-treating conditions, the urethane composition can be used in a wide range of very valuable applications. For example, these urethane compositions are useful as coating agents, adhesives, binders or paints for woven and knitted fabrics, leathers paper, wood, metals or plastics, compounding agents or water-repellents for concrete and mortar, assistants in the textile printing industry and the paper-making industry, and as hard-finishing agents, stiffness-imparting agents, anti-creasing agents, anti-shrinking agents, permanent setting agents, and anti-pilling agents for woven and knitted fabrics. The urethane compositions can be applied in suitable concentrations and viscosities using methods such as coating, laminating or impregnating procedures. These articles all exhibit superior water resistance, wash resistance and solvent resistance.

More particularly, the thermoreactive adhesive compositions of this invention can be utilized for bonding various materials in many fields because the composition is hydrophilic, can be used safely in aqueous systems, and is thermoreactive whereby the active isocyanate groups can be regenerated under very mild heat-treating conditions. For example, the adhesive composition can be adjusted to suitable viscosities, e.g., about 100 to 150,000 cps, and concentrations, e.g., about 20 to 60% by weight, and applied using methods such as coating, spraying or impregnation to bond the same kinds or different kinds of materials such as wood, paper, fibrous materials, natural and synthetic rubbers, plastics, urethane foams, metals and glass, thereby to produce various laminated materials and composite materials, such as plywoods, bonded fabrics, artificial leathers or laminates.

In the process of producing artificial leather of this invention, the adhesive is adjusted to a suitable viscosity, and applied using methods such as coating or spraying using conventional devices such as rollers, knives or sprays. If desired, the applied adhesive can be dried, and then the base cloth is bonded thereto. Or conversely, the adhesive is applied to the base cloth by the above method or by an impregnating method and, if desired, dried to a suitable extent, after which the base cloth is bonded to the sheet-like material. By heating the bonded assembly at about 100° to 160° C for 1 to 15 minutes, an artificial leather having superior bond strength, water resistance, wash resistance and solvent resistance can be obtained.

In preparing the fibrous product treating liquor, the urethane composition obtained as described above is also adjusted to a suitable concentration using water, e.g., about 0.5 to about 20% by weight, and applied to fibrous products by impregnation or spraying, etc., in a conventional manner. If desired, the treated fibrous products are squeezed to a suitable extent, if desired, predried at about 70° to 100° C for about 5 to 3 minutes, and then heat-treated. Generally, the heat-treatment is carried out at about 100° to 180° C for about 1 to 15 minutes. Preferably, the conditions are chosen as required depending on the material of the fibrous product. For example, with polyesters, the heat-treatment is carried out at about 160° to 180° C for about 1 minute. With cotton, the heat treatment is carried out at about 150° to 160° C for about 2 minutes; with nylon, at about 140° C for about 3 minutes; with acrylic polymers, at about 120° C for about 3 minutes; and with wool, at about 100 to 120° C for about 3 to 5 minutes.

In the preparation of the fibrous product treating liquor, a non-ionic or anionic resin of another kind, a softening agent, an antistatic agent or other processing agents may be added to the treating liquor. In some cases, durability also is achieved.

The fibrous products to which this embodiment of this invention can be applied include, for example, knitted fabrics, woven fabrics, or non-woven fabrics made of natural fibers such as cotton, wool or silk, regenerated fibers such as rayon or acetate, synthetic fibers such as polyester, polyamide, polyacrylonitrile or vinylon fibers, and mixtures thereof.

The following Examples and Comparative Examples are given to illustrate the present invention more specifically. All parts, percentages, ratios and the like in these examples are by weight unless otherwise indicated.

EXAMPLE 1

|  | Parts |
|---|---|
| Block Copolymer-Type Polyether Diol (OHV 46.7) (having an average molecular weight of 2400, comprising the addition product of ethylene oxide to polypropylene glycol having an average molecular weight of 1200) | 21 |
| Polyester Diol (a polyester diol derived from adipic acid/1,6-hexanediol/ neopentyl glycol (molar ratio 10:7:4) (OHV 45.1 AV 2.4) | 56 |
| 1,5-Hexanediol | 3 |
| Hexamethylene Diisocyanate | 20 |

Note: OHV = hydroxyl value
AV = acid value

The above four components were reacted at 100 to 105° C for 1 hour under a stream of nitrogen. The resulting prepolymer has an NCO/OH ratio of 2.06 and an oxyethylene chain content of 10.2%. The free NCO content was 5.13%, as calculated, and 5.02%, as found.

The prepolymer was cooled to 40° C, and 20 parts of dioxane was added to the prepolymer to adjust the viscosity. Then, 65 parts of a 25% aqueous solution of sodium bisulfite at 40° C was added, and the mixture was thoroughly stirred. In about 5 minutes, the mixture formed a uniform high-viscosity water-in-oil emulsion. Upon stirring the emulsion for an additional 15 minutes, the entire mixture became apparently transparent, and the viscosity of the mixture abruptly decreased. When water was added, it was easily mixed with the mixture to form a complete oil-in-wate emulsion. Then, 202 parts of water was added to produce a white emulsion with a solids content of about 30%.

A small amount of this emulsion was placed in a receptacle lined with Teflon, and dried at 40° C for one day. A colorless transparent viscous flowable material was obtained. This material was heat-treated for 5 minutes in an over at 150° C to form a non-tacky white semi-transparent film. The surface of the film was lustrous and the back of the film was not lustrous. The film had strong resilience and shape retention, and was not changed at all even when treated in boiling water for 2 hours. Also, the film did not change when it was immersed in various solvents for one week at room temperature (about 20° – 30° C).

Comparative Example 1

|  | Parts |
|---|---|
| Polyether Diol (same as in Example 1) | 15 |
| Polyester Diol (same as Diisocyanate Example 1) | 62 |
| 1,6-Hexanediol | 3 |
| Hexamethylene Diisocyanate | 20 |

The above four components were reacted at 100 to 105° C for 1 hour under a stream of nitrogen as in Example 1. The prepolymer obtained had an NCO/OH ratio of 2.05, and an oxyethylene chain content of 7.3%. The free NCO content was 5.13%, as calculated, and 5.05%, as found.

The prepolymer was cooled to 40° C, and 20 parts of dioxane was added to adjust the prepolymer viscosity. Then, 65 parts of a 25% aqueous solution of sodium bisulfite at 40° C was added, and the mixture was thoroughly stirred. The mixture did not become a uniform but, in about 10 minutes, a white high-viscosity emulsion was formed. The emulsion was stirred additionally, but not decrease in viscosity nor in the transparency of the emulsion occurred as in Example 1. About 1 hour later, water was added portionwise, and when the amount of water reached 50 parts, the emulsion formed separate phases. When the emulsion was allowed to stand overnight in this state, the prepolymer gelled.

EXAMPLE 2

|  | Parts |
|---|---|
| Adipic Acid-1,6-Hexanediol-Neopentyl Glycol (molar ratio 4:3:2) Type Polyester Diol (OHV 111.8, AV. 1.0) | 43 |
| Polyether Diol (OHV 110.5) (obtained by the random addition of ethylene oxide/propylene oxide (80:20 molar ratio) to polyethylene glycol (with an average molecular weight of 400)) | 35 |
| Xylylene Diisocyanate | 22 |

The above three components were reacted at 95 to 100° C for 1 hour under a stream of nitrogen. The resulting prepolymer had an NCO/OH ratio of 1.50 and an oxyethylene chain content of about 30%. The free NCO content was 3.29%, as calculated, and 3.16%, as found.

The prepolymer was cooled to 50° C, and 40 parts of a 30% aqueous solution of potassium bisulfite was added. These components were well mixed, and in about 3 minutes, a fairly viscous water-in-oil emulsion was formed. When the emulsion was stirred additionally, the emulsion became apparently transparent in about 15 minutes although no change occurred in the viscosity. The mixture was divided into two equal portions. 70 parts of water was added portionwise to one portion of the emulsion. When the total amount of water reached 30 parts, the viscosity began to decrease abruptly, and the mixture became an oil-in-water emulsion. When 70 parts of water was completely added, a white emulsion with a solid content of about 40% was obtained.

The other portion was allowed to stand at room temperature for one day, and then was diluted with 70 parts of water. While almost the same behavior as above was exhibited, a white emulsion having a solid content of about 40 was obtained.

These emulsions were placed in small amounts in a glass Petri dish and a container lined with Teflon, and dried at 40° C for one day. A film was not formed and a viscous flowable material remained. When they were heat-treated for 5 minutes in an oven at 150° C, colorless transparent films were formed. The film formed in the glass Petri dish adhered firmly, and was difficult to remove. From the Teflon-lined receptacle, the film could be removed. This film had higher resilience and shaped retention than the film obtained in Example 1. No change was observed in the film even when the film was treated for 2 hours in boiling water, or immersed for one week in various solvents such as perchloroethylene, cyclohexane, dimethylformamide, dimethyl sulfoxide, etc.

EXAMPLE 3

|  | Parts |
|---|---|
| Polyester Diol (same as in Example 2) | 36 |
| Polyethylene Glycol (average molecular weight of about 1000) (OHV 109.7) | 41 |
| 2,4- and 2,6-Tolylene Diisocyanate (80:20 by weight) | 23 |

The above three components were reacted at 80 to 85° C for 1 hour under a stream of nitrogen. The resulting prepolymer had an NCO/OH ratio of 1.73 and an oxyethylene chain content of 39.6%. The free NCO content was 4.68%, as calculated, and 4.52% as found.

The prepolymer was cooled to 50° C, and 60 parts of a 25% aqueous solution of sodium bisulfite at 40° was added. These components were thoroughly stirred, and in about 2 minutes, the mixture formed a uniform high-viscosity water-in-oil emulsion. On stirring the mixture for an additional 10 minutes, the mixture became apparently transparent. After stirring the mixture for another 10 minutes, 227 parts of water was added to produce a light yellow brown emulsion with a solid content of about 30%.

Comparative Example 2

|  | Parts |
|---|---|
| Polyester Diol (same as in Example 2) | 32 |
| Polyethylene Glycol (same as in Example 3) | 45 |
| Tolylene Diisocyanate (same mixture as in Example 3) | 23 |

The above three components were reacted in the same manner as in Example 3 to produce a prepolymer having an NCO/OH ratio of 1.73 and an oxyethylene chain content of 43.5%. The free NCO content was 4.69%, as calculated, and 4.48%, as found.

The prepolymer was cooled to 50° C, and 60 parts of a 25% aqueous solution of sodium bisulfite was added. The mixture were thoroughly stirred. Through almost the same process as in Example 3, the mixture became a light yellow brown emulsion with a solid content of about 30%.

Comparative Example 3

|  | Parts |
|---|---|
| Polyester Diol (same as in Example 2) | 15 |
| Polyethylene Glycol (same as in Example 3) | 62 |
| Tolylene Diisocyanate (same as in Example 3) | 23 |

The above three components were reacted in the same way as in Example 3 to produce a prepolymer having an NCO/OH ratio of 1.74 and an oxyethylene chain content of about 60%. The free NCO content was 4.73%, as calculated, and 4.53%, as found.

The prepolymer was cooled to 50° C, and 60 parts of a 25% aqueous solution of sodium bisulfite at 40° C was added. The components were thoroughly stirred. In about 1 minute, the mixture became uniform, but the viscosity of the mixture did not further increase. The mixture was stirred for an additional 20 minutes, and 227 parts of water was added to produce an apparently transparent light yellow brown emulsion with a solid content of about 30%.

Small amount of the emulsions obtained in Example 3 and Comparative Examples 2 and 3 were placed in Teflon-lined containers, and dried at 40° C for one day. None of the samples became films, but remained tacky substances. When they were heat-treated for 5 minutes in an oven at 140° C, all of the samples produced non-tacky transparent brown films which had substantially the same resilience and shape retention. When the samples were heat-treated in boiling water, the sample of Comparative Example 3 clearly swelled and became friable in about 30 minutes. The sample of Comparative Examples 2 gradually swelled in about 90 minutes, and became non-transparent in 2 hours. The sample of Example 3 did not change substantially even after a lapse of 2 hours.

EXAMPLE 4

|  | Parts |
|---|---|
| Polyether Diol (same as in Example 1) | 120 |
| Polyester Diol (same as in Example 1) | 105 |
| Trimethylolpropane | 3 |
| Xylylene Diisocyanate | 72 |

The above four components were reacted at 95 to 100° C for 1 hour under a stream of nitrogen to produce a prepolymer having an NCO/OH ratio of 2.02 and an oxyethylene chain content of 19.4%. The free NCO content was 5.42%, as calculated, and 5.26%, as found.

The prepolymer was cooled to 50° C, and 25 parts of dioxane was added to 100 parts of the cooled prepolymer. Then, 75 parts of a 25% aqueous solution of sodium bisulfite at 40° C was added to the mixture, followed by stirring the mixture thoroughly. In about 3 minutes, the mixture formed a uniform water-in-oil emulsion. On stirring the mixture for an additional 15 minutes, the mixture became apparently transparent. The mixture was stirred additionally for 10 minutes, and 196 parts of water was added to produce a white emulsion with a solid content of about 30%.

Comparative Example 4

200 parts of dioxane was added to 100 parts of the prepolymer obtained in Example 4. A solution of 3.8 parts of ethylene diamine in 50 parts of dioxane was added to the prepolymer solution, and the mixture was stirred well to polymerize the prepolymer. A high-viscosity urethane elastomer solution with a concentration of about 30% was obtained.

Comparative Example 5

233 parts of dioxane was added to 100 parts of the prepolymer obtained in Example 4 to produce a dioxane solution of the prepolymer of a concentration of about 30%.

Comparative Evaluation

The emulsion obtained in Example 4 (designated Sample A), the polyurethane elastomer solution obtained in Comparative Example 4 (designated Sample B), the urethane prepolymer solution obtained in Comparative Example 5 (designed Sample C), an emulsion prepared by emulsifying a conventional polyestertype polyurethane elastomer with a nonionic and an anionic emulsifier (Bondic 1030 (a trade name of an emulsified dispersion of a polyester polyurethane elastomer, manufactured by Dai-Nippon Ink & Chemicals, Inc.)) (designated Sample D), and an aqueous solution of a polyurethane elastomer resulting from the inclusion of a large quantity of polyoxyethylene chains in a polyurethane substrate to render the material hydrophilic (Sumipex Resin UN-2 (a trade name of an aqueous solution of a hydrophilic polyether polyurethane elastomer produced by Sumitomo Chemical Co., Ltd.)) (designated Sample E) were each adjusted to a concentration of 30%, and spread on a Teflon plate to a thickness of 0.1 mm. Each of the thus spread coatings was dried at 40° C for one day, and then heat-treated for 5 minutes at 150° C to form films.

The properties of the films were tested, and the results obtained are shown in Table 1.

Table 1

| Item Evaluated | Sample | | | | |
|---|---|---|---|---|---|
|  | A | B | C | D | E |
| Solution Stability | 0 | 0 | X | X | 0 |
| Resistance to Gum-up | 0 | X | X | X | Δ |
| Non-tackiness | 0 | 0 | 0 | Δ | X |
| Strength (kg/cm²) | | | | | |
| (a) | 335 | 285 | 375 | 248 | 26 |
| (b) | 320 | 247 | 344 | 115 | — |
| Elongation at Break (%) | | | | | |
| (a) | 343 | 720 | 367 | 492 | 348 |
| (b) | 380 | 693 | 385 | 739 | — |

Note:
0: Good
Δ: Somewhat poor
X: Very poor

The strength and elongation were measured using an Instron Tensile Tester.

In the evaluations of strength and elongation at break, (a) refers to the films as obtained, and (b) refers to the films treated for 30 minutes in boiling water. The film of Sample E, (b) dissolved in boiling water, and its strength and elongation could not be measured. Samples A and E had every good solution stability. Sample C gelled after one day. A small amount of precipitate was observed in Sample D, and with time, the amount of precipitate increased. Sample B had good solution stability if cares were taken about the vaporization of the solvent.

EXAMPLE 5

|  | Parts |
|---|---|
| Block Copolymer-type Polyether Diol (having an average molecular weight of 2400 (OHV 46.7) comprising the addition product of ethylene oxide to polypropylene glycol having an average molecular weight of 1200) | 21 |
| Adipic Acid/1,6-Hexanediol/Neopentyl Glycol (molar ratio 10:7:4) Type Polyester Diol (OHV 45.1; AV 2.4) | 56 |
| 1,6-Hexanediol | 3 |
| Hexamethylene Diisocyanate | 20 |

The above four components were reacted at 100 to 105° C for 1 hour under a stream of nitrogen to produce a prepolymer having an NCO/OH ratio of 2.06 an oxyethylene chain content of 10.2% and an ester group content of 19.8%. The free NCO content was 5.13%, as calculated, and 5.02%, as found.

The prepolymer was cooled to 40° C, and 20 parts of dioxane was added to adjust the viscosity of the prepolymer. Then, 65 parts of a 25% aqueous solution of sodium bisulfite at 40° C was added to the prepolymer, and the mixture was thoroughly stirred. In about 5 minutes, the mixture formed a uniform high-viscosity water-in-oil emulsion. On stirring the mixture for an additional 15 minutes, the entire mixture became apparently transparent, and the viscosity abruptly decreased. When water began to be added, the water easily mixed with the mixture to form a complete oil-in-water emulsion. When water was added in a total amount of 106 parts, a white emulsion with a solid content of about 40% was obtained.

A small amount of the resulting emulsion was placed into a glass Petri dish, and dried at 40° C for one day, when it became a viscous flowable material. When the material was heat-treated for 5 minutes in an oven at 150° C, a non-tacky white semi-transparent film was obtained. The film adhered firmly to the glass, and was difficult to peel off.

The resulting emulsion produced as described above was coated in an amount of 0.2 g on concrete mortar having a surface of a size of 5 × 1 cm. Furthermore, the emulsion was coated in a small amount on a commercially available nail with a head having a diameter of 8 mm which had been polished with No. 600 sandpaper. Also, the emulsion was coated in an amount of 0.1 g on a Japanese cypress timber square with a cross section of 1 × 1 cm (for use in making a model toy). These coated materials were all heat-treated at 150° C for 10 minutes, and the peel strength was measured. The results obtained were as follows:

| Concrete Mortar | 18 Kg/cm$^2$ |
|---|---|
| Nail | 15 Kg/cm$^2$ |
| Cypress Square | 23 Kg/cm$^2$ |

Comparative Example 6

|  | Parts |
|---|---|
| Polyether Diol (same as in Example 5) | 15 |
| Polyester Diol (same as in Example 5) | 62 |
| 1,6-Hexanediol | 3 |
| Hexamethylene Diisocyanate | 20 |

The four components were reacted at 100° to 105° C for 1 hour under a stream of nitrogen as in Example 5 to produce a prepolymer having an NCO/OH ratio of 2.05, an oxyethylene chain content of 0.3% and an ester group content of 21.9%. The free NCO content was 5.13%, as calculated, and 5.05%, as found.

As in Example 5, the prepolymer was cooled to 40° C, and 20 parts of dioxane was added to adjust the viscosity of the composition. Then, 65 parts of a 25% aqueous solution of sodium bisulfite at 40° C was added, and the mixture was thoroughly stirred. The mixture did not become uniform, but in about 10 minutes formed a white high-viscosity emulsion. The emulsion was further stirred, but no decrease in viscosity occurred nor did the emulsion become apparently transparent as in Example 5. After a lapse of about 1 hour, water was added to the emulsion portionwise. When the amount of water added reached 50 parts, the mixture clearly formed separate phases. When the mixture was allowed to stand overnight in this state, the prepolymer gelled.

EXAMPLE 6

|  | Parts |
|---|---|
| Adipic Acid/1,6-Hexanediol/Neopentyl Glycol (molar ratio 4:3:2) Type Polyester Diol )OHV 111.8; AV 1.0) | 42 |
| Polyether Diol (OHV 110.5) (resulting from the random addition of ethylene oxide/propylene oxide (80/20 molar ratio) to polyethylene glycol having an average molecular weight of 400) | 35 |
| 2,4-and 2,6-Tolylene Diisocyanate mixture (mixing ratio; 80:20 by weight) | 23 |

The above three components were reacted at 85 to 90° C for one hour under a stream of nitrogen to produce a prepolymer having an NCO/OH ratio of 1.72, an oxyethylene chain content of about 30% and an ester group content of 14.7%. The free NCO content was 4.65%, as calculated, and 4.48%, as found.

The prepolymer was cooled to 30° C, and 40 parts of a 30% aqueous solution of potassium bisulfite was added. The mixture was thoroughly mixed, and in about 3 minutes, a uniform water-in-oil emulsion having a fairly high viscosity was formed. On stirring the mixture for an additional 10 minutes, the mixture became apparently transparent, although no great change was observed in the viscosity of the mixture. The mixture was stirred additionally for 10 minutes, and 140 parts of water was added to form a light yellow brown emulsion having a solid content of about 40%. It was found that during the dilution, the viscosity abruptly decreased, and the mixture was converted to an oil-in-water emulsion.

Using the resulting emulsion as an adhesive, a 0.5 mm-thick aluminum plate, a 1 mm-thick rubber sheet having a hardness of 60, and a 1 mm-thick glass sheet were bonded in the following manner. Each of these materials was cut to a size of 2 × 10 cm. The aluminum plate was polished with No. 600 sandpaper. The rubber sheet and the glass sheet were degreased with chloroform. Then, the adhesive was applied in a small amount to each of the materials at 0.5 mm from the edge. The materials were then heat-treated at 130° C for 10 minutes, and the tensile shear strength was measured. The aluminum plate showed a tensile shear strength of 135 Kg/cm$^2$. But with the rubber sheet and the glass sheet, the adherends were broken when the load was 8 Kg and 35 Kg, respectively.

EXAMPLE 7

Three prepolymers were prepared by reacting polypropylene glycol having an average molecular weight of 1200 (PPG; OHV 93.9), a diol (PES; OHV 74.3; AV 1.5) obtained by esterifying polypropylene glycol having an average molecular weight of 700 with adipic acid in a molar ratio of 2:1, the same polyether diol as used in Example 6 (PE), and xylylene diisocyanate (XDI) at 110° to 115° C for 1 hour under a stream of nitrogen in accordance with the formulation shown in Table 2 below.

Table 2

| Raw Material (parts) | Sample F | Sample G | Sample H |
|---|---|---|---|
| PPG | 55 | 45 | 35 |
| PES | 0 | 10 | 20 |
| PE | 20 | 20 | 20 |
| XDI | 25 | 25 | 25 |
| NCO/OH Ratio | 2.02 | 2.07 | 12.12 |
| Free NCO Content | | | |
| Calculated (%) | 5.64 | 5.78 | 5.91 |
| Found (%) | 5.70 | 5.73 | 5.84 |
| Oxyethylene Chain Content (%) | About 18 | About 18 | About 18 |
| Ester Group Content (%) | 0 | 0.58 | 1.2 |

100 parts of each of the prepolymers was cooled to 40° C, and 75 parts of a 20% aqueous solution of sodium bisulfite was added. The mixtures were stirred thoroughly. In about 3 minutes, all of the mixtures became uniform. The mixtures were stirred for an additional 20 minutes, and then diluted with 113 parts of water to form bluish semi-transparent emulsions with a solid content of about 40%.

Using each of the resulting emulsions as an adhesive, the same rubber sheet as described in Example 6, a 0.5 mm-thick polyethylene terephthalate film, and unscoured canvas (No. 6) were bonded. Each of these materials was cut to a size of 5 × 10 cm. The rubber sheet and the polyethylene terephthalate film were degreased with chloroform. The adhesive was coated in an amount of about 1 g in an area measuring 5 × 5 cm at one end. The materials were then pre-dried at 80° C for 10 minutes, and heat-treated at 130° C for 10 minutes.

Each of the bonded materials was treated for 30 minutes in a perchloroethylene bath at 40° C and a 5% aqueous solution of sodium hydroxide at 60° C respectively using a Tergitometer (70 rpm). The peel strength was measured, and the results obtained are shown in Table 3.

Table 3

| | Adhesive | As Bonded (Kg/5cm) | After Treatment with Perchloroethylene (Kg/5cm) | After Treatment with a 5% NaOH Aqueous Solution (Kg/5cm) |
|---|---|---|---|---|
| Rubber Sheet | F | 12.0 | 2.4 | 8.2 |
| | G | 20.5 | 7.3 | 10.8 |
| | H | 22.8 | 20.7 | 21.5 |
| Polyethylene Terephthalate Film | F | 12.1* | 2.1 | 7.4 |
| | G | 11.4* | 6.7 | 8.6 |
| | H | 12.8* | 13.5* | 10.7* |
| Canvas | F | 26.3 | 9.5 | 9.2 |
| | G | 28.4 | 13.7 | 14.0 |
| | H | 31.7 | 32.1 | 28.9 |

*Adherend broke.

EXAMPLE 8

| | Parts |
|---|---|
| Polypropylene Glycol (having an average molecular weight of 1200 (OHV 93.9)) | 50 |
| Polyethylene Glycol (having an average molecular weight of 1000 (OHV 109.7)) | 15 |
| Polyester Diol (same as in Example 6) | 10 |
| 2,2,4-Trimethylhexamethylene Diisocyanate | 25 |

The above four components were reacted at 105° to 110° C for 1.5 hours under a stream of nitrogen to produce a prepolymer having an NCO/OH ratio of 1.79, an oxyethylene chain content of 14.5%, and an ester group content of 3.5%. The free NCO content was 4.40%, as calculated, and 4.45%, as found.

The prepolymer was cooled to 40° C, and 70 parts of a 20% aqueous solution of sodium bisulfite was added. The mixture was thoroughly stirred. In about 3 minutes the mixture became uniform. On stirring the mixture for an additional 10 minutes or so, the mixture became apparently transparent. The mixture was stirred for an additional 10 minutes, and then 115 parts of water was added to form a semi-transparent white emulsion with a solid content of about 40%.

A commercially available plywood (thickness: 4 mm) was cut to a size of 3 × 10 cm, and the above emulsion as an adhesive was coated in an amount of 1 g on an area measuring 3 × 5 cm at one end, and each of a 0.5 mm thick soft polyvinyl chloride sheet and a commercially available wallpaper, each of a size of 3 × 15 cm, was bonded to the plywood. The assembly was pre-dried for 10 minutes in an oven at 80° C, and heat-treated for 2 minutes using a hot press at 140° C and 2 Kg/cm². The peel strength at 180° C of the resulting composite materials was 15 Kg for the polyvinyl chloride sheet, but in the case of the wallpaper, the composite material broke when the load was 9.5 Kg.

EXAMPLE 9

Two prepolymers J and K were prepared by reacting a block copolymer-type polyether diol (PE; OHV 46.7) having an average molecular weight of 2400 prepared by the addition of ethylene oxide to polypropylene glycol having a average molecular weight of 1200, an adipic acid/1.6-hexanediol/neopentyl glycol (molar ratio 10:7:4) type polyester diol (PES; OHV 45.1; AV 2.4), 1,6-hexanediol (1,6HD), and hexamethylene diisocyanate (HDI) for 1 hour at 100° to 105° C under a stream of nitrogen in accordance with the formulations shown in Table 4.

TABLE 4

| Raw Material (parts) | Sample J | Sample K |
|---|---|---|
| PE | 21 | 15 |
| PES | 56 | 62 |

TABLE 4-continued

| | Sample | |
|---|---|---|
| | J | K |
| 1,6HD | 3 | 3 |
| HDI | 20 | 20 |
| NCO/OH Ratio | 2.06 | 2.05 |
| Free NCO Content | | |
| Calculated (%) | 5.13 | 5.13 |
| Found(%) | 5.02 | 5.05 |
| Oxyethylene Chain Content (%) | 10.2 | 7.3 |
| Ester Group Content (%) | 19.8 | 21.9 |

The two prepolymers obtained were cooled to 40° C, and 20 parts of dioxane was added to each of the polymers to adjust the viscosity of the prepolymer solution. 65 parts of a 25% aqueous solution of sodium bisulfite was added to each of the prepolymer solutions, and the mixture was thoroughly stirred. The mixture of Sample J formed a uniform high-viscosity water-in-oil emulsion in about 5 minutes. On stirring the mixture for an additional 15 minutes, the entire mixture became apparently transparent, and its viscosity abruptly decreased. When water began to be added, the water easily mixed with the mixture to form a complete oil-in-water emulsion. When water was added in a total amount of 106 parts, a white emulsion with a solid content of about 40% was obtained. The Sample K mixture, however, did not become a uniform system, and in about 10 minutes, a white high-viscosity emulsion was formed. This emulsion was further stirred, but no decrease in viscosity occurred nor did Sample K become apparently transparent as did Sample J. After the lapse of about 1 hour, water was added portionwise. When the total amount of water added reached about 50 parts, the mixture clearly formed separate phases. When the mixture was allowed to stand overnight in this state, the prepolymer gelled.

EXAMPLE 10

Three prepolymers L, M and N were prepared by reacting polypropylene glycol having an average molecular weight of 1200 (PPG; OHV 93.9), a polyester diol (PES; OHV 74.3; AV 1.5) prepared by esterifying polypropylene glycol having an average molecular weight of 700 with adipic acid in a molar ratio of 2:1, a polyether diol (PE; OHV 110.5) resulting from the random addition of ethylene oxide/propylene oxide (80:20 molar ratio) to polyethylene glycol having an average molecular weight of 400, and xylylene diisocyanate (XDI) at 110° to 115° C for 1 hour under a stream of nitrogen in accordance with the formulations shown in Table 5.

TABLE 5

| | Sample | | |
|---|---|---|---|
| | L | M | N |
| Raw Material (parts) | | | |
| PPG | 55 | 45 | 35 |
| PES | 0 | 10 | 20 |
| PE | 20 | 20 | 20 |
| XDI | 25 | 25 | 25 |
| NCO/OH Ratio | 2.02 | 2.07 | 2.12 |
| Free NCO Content | | | |
| Calculated (%) | 5.64 | 5.78 | 5.91 |
| Found (%) | 5.70 | 5.73 | 5.84 |
| Oxyethylene Chain Content (%) | About 18 | About 18 | About 18 |
| Ester Group Content (%) | 0 | 0.58 | 1.2 |

100 parts of each of the resulting prepolymers was cooled to 40° C, and 75 parts of a 20% aqueous solution of sodium bisulfate was added, followed by thoroughly stirring the mixture. All of the mixtures became uniform in about 3 minutes. These mixtures were stirred respectively for 20 minutes, and then diluted with 113 parts of water to form semi-transparent bluish emulsions with a solid content of about 40%.

EXAMPLE 11

Each of the adhesive samples J, L, M and N was coated on a 0.3 mm-thick nylon film at a coverage of 300 g/m$^2$, and a cotton knitted fabric was bonded onto the coated surface. The bonded assembly was heat-treated in an oven at 130° C for 7 minutes to form artificial leathers.

Each of the artificial leathers was washed with an aqueous solution containing 0.5% soap and 0.3% sodium carbonate at 70 rpm for 30 minutes at 50° C using a Tergitometer. Separately, each of the leathers was tested in perchloroethylene at 70 rpm for 30 minutes at 30° C using a Tergitometer. As a result, no abnormality was found in the adhesive Samples J and N. In the case of Samples L and M, peel-off occurred partially in the washing test, and substantial peel-off occurred in the perchloroethylene test.

EXAMPLE 12

A nylon jersey was bonded to a 0.3 mm-thick polyvinyl chloride film in the same way as in Example 11, and the bonded assembly was heat-treated in an oven at 150° C for 5 minutes to form an artificial leather.

The leather was subjected to the same washing test and perchloroethylene test as in Example 11. No abnormality occurred in Samples J and N. In the case of Samples L and M, partial peel-off occurred in the washing test. Complete peeling of Sample L occurred in the perchloroethylene test, and substantial peeling occurred with Sample M.

EXAMPLE 13

Lankrotan A-52 (a trade name for methyl ethyl ketone/dimethylformamide solution of a polyester-type polyurethane resin, a product of Lankro Chemicals Ltd., Britain) was spread on a mold releasing paper in a thickness of 0.5 mm to form a film. Each of the adhesive samples was coated on the thus obtained paper at a coverage of 300 g/m$^2$. A non-woven fabric composed entirely of Tetoron (trade name for a polyester produced by Teijin, Ltd.) was bonded onto the adhesive coated paper, and the bonded assembly was heat-treated in an oven at 150° C for 5 minutes to form a artificial leather. The leathers were subjected to the same washing and perchloroethylene tests as in Example 11. As a result, no abnormality was found in Samples J and N. In the case of Samples L and M, a partial peeling occurred both in the washing and perchloroethylene tests.

EXAMPLE 14

Two urethane prepolymers P and Q were prepared by reacting block copolymer-type polyether diol having an average molecular weight of 2400 (PE; OHV 46.7) resulting from the addition of ethylene oxide to polypropylene glycol having an average molecular weight of 1200, an adipic acid/1,5-hexanediol/neopentyl glycol (molar ratio 10:7:4) type polyester diol (PES; OHV 45.1; AV 2.4), 1,6-hexanediol (1,6HD) and hexamethylene diisocyanate (HDI) at 100° to 105° C for 1 hour under a stream of nitrogen in accordance with the formulations shown in Table 6.

Table 6

| | Sample | |
|---|---|---|
| | P | Q |
| Raw Material (parts) | | |
| PE | 21 | 15 |
| PES | 56 | 62 |
| 1,6HD | 3 | 3 |
| HDI | 20 | 20 |
| NCO/OH Ratio | 2.06 | 2.05 |
| Free NCO Content | | |
| Calculated (%) | 5.13 | 5.13 |
| Found (%) | 5.02 | 5.05 |
| Oxyethylene Chain Content | | |
| in the Prepolymer (%) | 10.02 | 7.3 |

100 parts of each of the resulting prepolymers P and Q was cooled to 40° C, and 20 parts of dioxane was added to adjust the viscosity of the prepolymer solution. Then, 65 parts of a 25% aqueous solution of sodium bisulfite at 40° C was added, and the mixtures were thoroughly stirred. The mixture of Sample P formed a uniform high-viscosity water-in-oil emulsion in about 5 minutes. On stirring the mixture for an additional 15 minutes, the entire mixture became apparently transparent, and the viscosity abruptly decreased. When water began to be added, the water easily mixed with the mixture to form a complete oil-in-water emulsion. When the water was added in a total amount of 202 parts, a white emulsion with a solid content of about 30% was obtained.

On the other hand, the Sample Q mixture did not easily form a uniform system, and, in about 20 minutes, became a white high-viscosity emulsion. When the emulsion was further stirred, no decrease in viscosity occurred nor did the mixture become apparently transparent as did Sample P. After a lapse of about 1 hour, water was added portionwise. When the total amount of water added reached about 50 parts, the mixture clearly formed separate phases. When it was allowed to stand overnight in this state, the prepolymer gelled.

EXAMPLE 15

Two urethane prepolymers R and S were prepared by reacting an adipic acid/1,6-hexanediol/neopentyl glycol (4:3:2) type polyester diol (PES; OHV 111.8; AV 1.0), polyethylene glycol having an average molecular weight of about 1000 (PE: OHV 109.7) and xylylene diisocyanate (XDI) at 95 to 100° C for 1 hour under a stream of nitrogen in accordance with the formulations shown in Table 7.

Table 7

| | Sample | |
|---|---|---|
| | R | S |
| Raw Material (parts) | | |
| PES | 36 | 15 |
| PEG | 41 | 62 |
| XDI | 23 | 23 |
| NCO/OH Ratio | 1.60 | 1.61 |
| Free NCO Content | | |
| Calculated (%) | 3.86 | 3.91 |
| Found (%) | 3.76 | 3.83 |
| Oxyethylene Chain Content | | |
| in the Prepolymer | 39.6 | About 60 |

100 parts of each of the resulting prepolymers R and S was cooled to 40° C, and 50 parts of a 30% aqueous solution of potassium bisulfite was added. The mixtures were thoroughly stirred. Sample R formed a uniform high-viscosity water-in-oil emulsion in about 2 minutes. On stirring the mixture for an additional 10 minutes, the mixture became apparently transparent. The mixture was further stirred for 10 minutes, and 233 parts of water was added to produce a semi-transparent emulsion with a solid content of about 30%.

Sample S became uniform in about 1 minute, but its viscosity did not further increase. After stirring the mixture for an additional 20 minutes in this state, 233 parts of water was added to produce a bluish almost transparent emulsion with a solid content of about 30%.

EXAMPLE 16

A knitted cotton (100%) fabric which had been scoured was immersed in a 5% aqueous solution of each of the finishing agent Samples, P, R and S obtained in Examples 14 and 15, and squeezed with a mangle to a pick-up of 80%. The fabric was then pre-dried at 100° C for 3 minutes, and heat-treated at 150° C for 3 minutes. All the treated fabrics had a far higher thick feel and higher resilience and shape retention than the non-treated fabric.

The treated fabrics were washed once and 10 times respectively using the washing conditions shown below. Furthermore, separately, the treated fabrics were cleaned once under the following dry-cleaning conditions. A part of each of the washed fabrics was cut to a size of 2 × 15 cm, and the elongation recovery of the samples was measured. The results obtained are shown in Table 8.

Washing Conditions
  Alcocolor (synthetic detergent for household use) 2 g/liter, using a home electric washer; washed for 10 minutes at room temperature; (about 20°-30° C); rinsed for 15 minutes; dried at 60° C.

Dry-cleaning Conditions
  In perchloroethylene: using a Tergitometer; treated at 70 rpm, 30° C, for 30 minutes.

Table 8

| | Sample | | | Blank (fabric treated with water) |
|---|---|---|---|---|
| | P | R | S | |
| As Initially Finished (%) | 97 | 95 | 95 | 86 |
| After Washing Once (%) | 95 | 95 | 88 | — |
| After Washing 10 Times (%) | 95 | 93 | 85 | — |
| After Dry-cleaning (%) | 96 | 95 | 94 | — |

The elongation recovery was determined by stretching the sample 50%, maintaining it at 50% stretch for 1 minute, and measuring the recovery rate 30 seconds later. It can be seen from the results in Table 8 that good durable elongation recovery was imparted to Samples P and R.

EXAMPLE 17

A scoured polyester (100%) jersey was immersed in a 5% aqueous solution of each of Samples P, R and S obtained in Examples 14 and 15, squeezed with a mangle to a pick-up of 80%, pre-dried at 100° C for 3 minutes, and then heat-treated at 150° C for 3 minutes. These treated fabrics all had a far higher thick feel, stiffness and higher resilience and shape retention than the untreated polyester jersey.

These treated fabrics were washed once and 10 times respectively under the conditions described in Example 16, and the crease recovery angle was measured by JIS-L 1004 (Monsanto method). The values obtained were the sum total of those in the longitudinal and transverse directions. The results obtained are shown in Table 9.

Table 9

|  | Sample | | | Blank (fabric treated with water) |
|---|---|---|---|---|
|  | P | R | S |  |
| As Initially Finished (°) | 334 | 330 | 332 | 276 |
| After Washing Once (°) | 330 | 326 | 295 | — |
| After Washing 10 Times (°) | 331 | 322 | 284 | — |

It can be seen from these results that with Samples P and R, good durable crease resistance can be achieved.

EXAMPLE 18

A worsted wool (100%) woven fabric (a brown dyed plain-weave fabric) was immersed in a 5% aqueous solution of each of Samples P, R and S obtained in Examples 14 and 15, squeezed to a pick-up of 80% using a mangle, pre-dried at 100° C for 3 minutes, and heat-treated for 5 minutes at 150° C. Stiffness was somewhat imparted to the treated fabrics as compared with the non-treated fabric, but their feel did not change greatly. A square sample of a size of 15 cm × 15 cm was cut from each of the treated fabrics. All the corners of each of the square samples were marked with a white thread, and the samples were washed once, 5 times, and 10 times respectively under the washing conditions described in Example 16. The area shrinkage of each of the samples was then measured. The results obtained are shown in Table 10.

Table 10

|  | Sample | | | Blank (fabric treated with water) |
|---|---|---|---|---|
|  | P | R | S |  |
| After Washing Once (%) | 0.8 | 1.0 | 5.4 | 16.7 |
| After Washing 5 Times (%) | 1.1 | 1.2 | 9.2 | 19.4 |
| After Washing 10 Times (%) | 1.3 | 1.8 | 17.3 | 21.5 |

It can be seen that with Samples P and R, good shrinkage resistance can be achieved.

EXAMPLE 19

An unscoured acrylic (100%) jersey was immersed in a 5% aqueous solution of each of Samples P, R and S obtained in Examples 14 and 15, squeezed using a mangle to a pick-up of 100%, pre-dried at 95° C for 5 minutes, and then heat-treated at 120° C for 3 minutes.

The treated fabrics had far higher thick feel, stiffness and resilience and shape retention than the non-treated fabric.

These treated fabrics were washed once and 10 times under the conditions described in Example 16. Separately, the treated fabrics were cleaned once under the dry-cleaning conditions of Example 16. Each of the tested fabrics was cut into a piece of a size of 10 cm × 10 cm. The edge of each of the test pieces was bonded with a synthetic adhesive in a width not exceeding 0.5 cm, and the anti-pilling property of the sample was tested using an accelerator-type pilling tester at 2000 rpm for 75 minutes. The lining rubber coating used had a hardness of 60 and a thickness of 1 mm. The results obtained are shown in Table 11.

Table 11

|  | Sample | | | Blank (fabric treated with water) |
|---|---|---|---|---|
|  | P | R | S |  |
| As Initially Finished (class) | 5 | 5 | 5 | 1 |
| After Washing Once (class) | 5 | 5 | 4 | 1–2 |
| After Washing 10 Times (class) | 4–5 | 4 | 2–3 | 1–2 |
| After Dry-cleaning (class) | 5 | 5 | 5 | 1–2 |

These results demonstrate that with Samples P and R, good durable anti-pilling property can be achieved.

While the invention has been described in detail and with reference to specific embodiments thereof, it will be apparent to one skilled in the art that various changes and modifications can be made therein without departing from the spirit and scope thereof.

What is claimed is:

1. A hydrophilic and thermoreactive urethane composition prepared by forming a low-molecular-weight, substantially gel-free urethane prepolymer containing free isocyanate groups by reacting a member selected from the group consisting of (a) (1) a compound containing at least 2 hydroxyl groups, containing an oxyethylene chain, and having a molecular weight of about 200 to 20,000 or (2) an admixture of a compound containing at least 2 hydroxyl groups, not containing an oxyethylene chain, and having a molecular weight of about 200 to 20,000 and a compound containing at least 2 hydroxyl groups, containing an oxyethylene chain and having a molecular weight of about 200 to 20,000; and (b) an excess of a polyisocyanate, whereby said prepolymer has an oxyethylene chain content of 10 to 40% by weight, and reacting said prepolymer or a solution thereof in an inert solvent with up to 3 times the equivalent of the free isocyanate groups in said prepolymer of an aqueous solution of a bisulfate salt of a concentration of at least 15% by weight thereby to block the free isocyanate groups with the bisulfite and render the urethane prepolymer hydrophilic.

2. The composition of claim 1, wherein said reacting to produce said prepolymer is in the presence of a chain extending agent containing at least 2 active hydrogen atoms.

3. The composition of claim 1, wherein said compound containing at least 2 hydroxyl groups is polyether, polyester or a polyether ester.

4. The composition of claim 1, wherein said prepolymer is prepared in the absence of a solvent.

5. The composition of claim 1, wherein said prepolymer is prepared in the presence of a hydrophobic solvent.

6. The composition of claim 1, wherein said prepolymer per se is reacted with up to three times the equivalent of the free isocyanate groups in said prepolymer of said aqueous solution of said bisulfite salt.

7. The composition of claim 1, wherein the reaction of said prepolymer or said solution thereof with up to three times the equivalent of the free isocyanate groups in said prepolymer of an aqueous solution of a bisulfite salt involves a reaction system consisting essentially of said prepolymer or a solution thereof in an inert solvent with said aqueous solution of a bisulfite salt.

8. The composition of claim 1, wherein said polyisocyanate is selected from the group consisting of isomers of tolylene diisocyanate, aromatic diisocyanates, araliphatic diisocyanates, alicylic diisocyanates, aliphatic diisocyanates and addition products of said polyisocyanates with a polyhydric alcohol.

9. The composition of claim 1, wherein the free isocyanate group content of the prepolymer is about 10% by weight or less.

10. The composition of claim 1, wherein said bisulfite salt is sodium bisulfite or potassium bisulfite.

11. The composition of claim 1, wherein said reacting with said bisulfite salt is at a temperature of about 60° C or lower.

12. The composition of claim 1, wherein said solvent is selected from the group consisting of a ketone, an ether, an amide, a nitrile, an ester, a hydrocarbon and a halogenated hydrocarbon.

13. A thermoactive aqueous adhesive composition comprising the hydrophilic and thermoreactive urethane composition of claim 1, wherein said urethane prepolymer contains at least 1% by weight ester groups.

14. A process for producing artificial leather which comprises bonding a sheet-like material capable of being used as a topcoat to a fabric capable of becoming a base with the thermoactive aqueous adhesive composition of claim 13.

15. A process for finishing a fibrous product comprising treating the fibrous product with a liquor comprising the hydrophilic thermoreactive urethane composition of claim 1.

* * * * *